Patented Apr. 5, 1949

2,466,014

UNITED STATES PATENT OFFICE 2,466,014

LIQUID SEPARATION

Arvid M. Erickson, San Jose, and John D. Ryan, Campbell, Calif., assignors to Barron-Gray Packing Company, San Jose, Calif., a corporation of California No Drawing. Application February 12, 1942, Serial No. 430,612

15 Claims. (Cl. 99—2)

This invention relates to a method for separating liquid from solid materials. More particularly it relates to a method for separating from fruit material a liquid including the sweetening ingredients of the fruit.

The art of extracting and purifying sugar from sugar-cane and sugar-beets in particular, although far from perfection, has long since passed the stage where it became commercially practical. The sucrose sugar obtained from these sources is however, known to be inferior to other sugars as a means of sweetening food, at least in some respects. For example, certain persons who are unable to eat substantial quantities of sucrose suffer no ill effects from the consumption of like quantities of other sugars, such as those which form by far the larger part of the natural sugar content of fruit.

With the foregoing in mind efforts have been made to extract sugar from fruit or to prepare a sweetening medium from fruit with the result that methods have been developed for producing a sugar bearing liquid which is to some extent refined, but no practical commercial method has heretofore been devised for producing a real sweetening medium from fruit. The methods developed have been not only impractical but have lead to products which contain objectionable impurities in the form of acids or bitter salts.

By way of illustrating the difficulties, it is pointed out that the juice of fruits is not only more difficult to extract from the pulp than is the juice of sugar-cane and beets, but, in addition, methods suitable for purifying the juice of sugar-cane and beets, which contain sucrose as the principal sugar constituent, are not satisfactory for purifying fruit juices which contain, as their principal sugar constituents, the sugars naturally occurring in fruit. It appears that the organic acids and non-sugars in fruit juices, which are of a different type from those found in cane and beet juices, have a tendency to retain the sugar in the pulp and to oppose its release by pressing. It further appears that the cells in the fruit which contain the sugar are smaller and that the walls of the cells are of a more gelatinous construction, which is somewhat elastic, so that pressing instead of rupturing the cell merely compresses it and forms a slime or smooth, creamy mass instead of producing a clean break of the juice. The juice thus cannot be satisfactorily extracted by diffusion alone.

A sugar-bearing juice has been extracted from fruit pulp with diatomaceous earth for the purpose of providing a sweetening medium for fruit but the results were not satisfactory. The pulp residue remaining after the earth treatment is of no value as a feed, due to its objectionable earth content, and in addition the method is expensive, and many impurities are carried along in the sugar-bearing liquid extracted, so that it is not a sweetening medium particularly with respect to fruit since it includes the materials of the fruit which detract from the sweetening power of the sugars present and is thus no sweeter itself than fruit.

The term "sweetening medium" is used frequently herein. This term as used herein means just what the name signifies, i. e., it is a sugar containing medium which is substantially free of materials which detract from the sweetening power of the sugars present, such as acids and ash-forming materials, although it may contain substantial quantities of inert diluents.

It is an object of this invention to provide an improved method for extracting from fruit material, whole or waste or any other form, the sweetening ingredients thereof.

A more specific object is to provide an improved method for separating from fruit material the sweetening ingredients thereof in the form of an aqueous solution which can be readily processed to convert it into a sweetening medium.

A further object is to provide a method by which water-soluble constituents of fruit may be readily separated from the water-insoluble constituents of the fruit, in accordance with which method the separation of the water-soluble sweetening ingredients of the fruit is substantially complete and the separated water-soluble constituents are obtained in the form of an aqueous solution.

Another object is to provide a method for separating from fruit pulp the sugar-bearing juices of the fruit.

A still further object is to provide a process for treating fruit material which has been ground to a fine pulp to cause the pulp to release a sugar-bearing juice.

Still another object is to provide a process for treating a fine juicy fruit pulp to put it into a condition such that it may be readily separated by a simple filtration step into an insoluble portion and a liquid portion containing substantially all the sweetening ingredients of the fruit.

Another object is to cause fruit juice to flow out of the pulp freely during filtration of pulped fruit material.

A still further object is to provide a process for separating sweetening ingredients of fruit from the insoluble solid portions thereof in such a manner that the insoluble solids, as well as the sweetening ingredients, may be recovered in a useful form.

A still further object is to provide a process for treating a fine, juicy fruit pulp to simultaneously precipitate water-soluble impurities and put the pulp into a condition such that it may be readily separated by a simple filtration step into an insoluble portion and a liquid portion containing substantially all the sweetening ingredients of the fruit.

Other objects will appear hereinafter.

It has now been found that the foregoing objects may be accomplished by adding certain divalent alkaline materials to the fruit prior to filtration and pressing, the alkaline materials being added in a quantity sufficient to materially increase the pH of the pulp mixture to a definitely alkaline pH and to promote juice extraction, but not in a quantity sufficient to give the extracted juice a pH in excess of about 9. Whereas fruit, even when ground to a fine pulp and thinned with water, does not release the juice present in the fruit but instead when pressed forms a slime or smooth creamy mass from which the juice does not flow, it has been found that at the alkaline pH produced by the presence of certain divalent alkaline materials the juice breaks out of the fruit cleanly on pressing and can be separated substantially completely from the solid pulp by filtering and washing the last portions of the juice out of the filter cake with a suitable solvent such as water.

This substantially complete separation of a juice containing substantially all the sweetening ingredients of the fruit is, moreover, accomplished without creating additional difficulties in the further treatment of the juice to produce a sweetening medium therefrom, provided certain precautions are observed, as directed hereinafter. In addition, the insoluble portions of the pulp, instead of being left in a useless form, are actually enhanced in value, particularly for use as fertilizer, and some water-soluble impurities are precipitated and left behind with the insoluble portions of the pulp. Also, the alkaline material present in the juice as a result of such treatment is desirable rather than undesirable because more alkaline material, at least of the same type, is added to the juice in preparing a sweetening medium therefrom.

In accordance with the preferred form of the invention, fruit, particularly non-citrous fruit, for example, raw fruit, such as peaches, pears, apples, grapes, and the like, or dried fruit, such as raisins and prunes, or the wastes from fruit packs, such as the waste from packing mixed fruit, known as fruit salad or fruit cocktail, or other fruit wastes, or mixtures of two or more of the foregoing, are ground to a fine pulp in a suitable pulper, of which a number are available. It is preferable, however, to avoid beating, pressing or maceration or even excessive grinding or pressing of any fruit which includes skins, seeds, cores, etc., since this tends to free coloring matter or impurities present therein and is not necessary to bring about the substantially complete extraction of sweetening ingredients.

If the fruit material, as is usually the case, does not contain sufficient liquid to ensure complete extraction of the sweetening ingredients, it is preferable to add water, although its addition may be omitted, if desired. The water may be added at any time prior to filtration but when added prior to grinding the fruit, in addition to aiding extraction of the sweetening ingredients, it also aids the grinding and helps to prevent air oxidation of the ground fruit.

It will be apparent that the presence of excessively large quantities of water in the pulp unnecessarily increases the quantity of liquid which must be handled and that, on the other hand, where only a very small quantity of water is present the pulp mixture may be so thick that it does not heat readily and, in addition, there is the danger that a substantial portion of the sweetening ingredients will remain with the pulp and will not be extracted. Accordingly, the preferred quantity of water to have present in the fruit material is the minimum quantity capable of extracting substantially all of the sweetening ingredients from the material being treated, and to this end the preferred quantity to add is just about the quantity necessary to increase the water content of the pulp mixture to the preferred amount. It is within the scope of the invention, however, to add amounts of water both greater and less than the preferred amounts. The quantity of water to be added in any given case to increase the amount present to the preferred amount will vary considerably, depending upon the nature of the fruit material. A small amount of water, on the order of about 10% by weight, based on the weight of the fruit, is usually sufficient in the case of fruit of normal water content, but if the fruit being treated is dried fruit the quantity of water which is preferably added will be much greater, being of the order of about 300% by weight, based on the weight of the fruit.

While the alkaline material may be added at any time prior to the filtration step, it is preferable to add it following the grinding of the fruit to a fine pulp and to thoroughly agitate the mass during and after the addition of the alkaline material. One exception to this general rule occurs where the fruit material has a very low water content and the alkaline material is diluted with a large quantity of water to supply a substantial portion of the water required to extract the sweetening ingredients of the fruit, in which case it is preferable to add the alkaline material prior to grinding. The addition of the alkaline material after grinding is generally preferable because at this stage it can be better distributed in the ground fruit and, with the aid of agitation during and after the addition of the alkaline material, local high concentrations thereof, with resulting discoloration, may be avoided. Where the solution of alkaline material is very dilute and the fruit is low in water content, local high concentrations of alkaline material do not occur even without uniform distribution, and the advantage of having added water present during grinding makes the addition prior to grinding preferable.

The water to be added as described above need not be pure water and need not be added as such. For example, instead of adding relatively pure water, the water added may contain other materials which are not undesirable. Thus, the water derived from washing the solid materials from which the solution of sweetening ingredients has been separated in accordance with this invention, or from washing the impurities precipitated out of the extracted juice in the process of preparing a sweetening medium therefrom, may be used. The use of this water has the advantage that the sweetening ingredients of the wash water are recovered without diluting the juice or sweetening medium with the washings.

Another advantageous way to add water is with the alkaline material in the form of a solvent for the alkaline reagent. It is preferable in any case to add the alkaline reagent in the form of an aqueous solution. Preferably, also, this solution is made relatively dilute so as to avoid producing high concentrations of alkaline material at any point in the mass. It will be apparent that the more dilute the alkaline material is when added, the less the danger of such high concentrations. By way of illustration, it is pointed out that while satisfactory results have been obtained with alkaline reagent solutions having concentrations as high as 10%, it is preferable that the concentrations of these solutions shall not exceed about 6%. It may be noted that in the case of solutions of alkaline material having concentrations of the order of 6%, the amount of water added with the alkaline material, as compared with that present in the mass of fruit material is practically negligible since the quantity of 6% lime solution ordinarily added to the pulped fruit, is of the order of one gallon per ton of water in the pulped fruit.

Suitable alkaline materials are those which can be readily eliminated from the liquid at a later stage of the process, particularly where the extracted juice is to be converted into a sweetening medium. It is also preferable that the alkaline material be one which is capable of precipitating undesired impurities, particularly if a sweetening medium is to be made from the juice. While alkaline materials, both organic and inorganic, particularly divalent alkaline materials, or other materials adapted to increase the pH, may be used, the oxides and hydroxides of the alkaline earth metals and magnesium, such as the oxides and hydroxides of barium, calcium, magnesium, and strontium, and particularly lime, have been found to be especially suited since these are readily eliminated at a later stage, where that is desirable, and since further quantities of such divalent alkaline materials are added during the defecation of the extracted juices to prepare a sweetening medium therefrom.

While the addition of any quantity of alkaline material which provides a substantial increase in the pH of the pulp will promote the extraction of the juice to some extent, it has been found that in general a given pulp will have an optimum pH on the alkaline side, at which pH a maximum of juice may be extracted without substantial loss due to saccharation and without substantial darkening of the juice. It is usually more convenient to determine the quantity of alkaline material to be added on the basis of the pH of the pulp, but the pH of the juice expressed by the pulp is also important. Thus, it has been found that where the pH of the expressed juice is appreciably in excess of 9 substantial reaction of sugar with the alkaline material such as lime to form insoluble saccharates takes place and under these conditions substantial quantities of the sugar are left behind in the pulp in the form of insoluble compounds. Where the pH of the extracted juice does not exceed 9 however, little or no sugar is left behind, although substantial quantities of impurities are precipitated and left in the pulp. Thus the alkaline pH of the pulp referred to above will at least be low enough so that the pH of the expressed juice is not greater than about 9 but preferably great enough so that the pH of the expressed juice is on the alkaline side.

Particular attention is called to the fact that so far as saccharation is concerned it is the pH of the expressed juice which is important and not that of the pulp. While there is a relationship between the pH of the pulp and that of the juice expressed from it in a given case, the pH of the pulp prior to pressing is usually substantially higher than that of the expressed juice. This believed to be due to the fact that in the pulp mixture certain acidic materials of the fruit are held in such fashion that they do not go into solution except upon pressing the pulp and upon going into solution during pressing react with the alkaline material reducing the pH.

The optimum pH to which to adjust the pH of the pulp may be readily determined by a simple test. It is merely necessary to take a small portion of the fruit to be treated and grind it to a fine pulp, adding water if necessary. The pulp is divided up into a number of small portions and alkaline material is added thereto in amounts increasing with successive portions sufficiently to give each succeeding portion a pH which is 0.5 higher than that of the preceding one. The various samples are then pressed to extract the juice and the pH of the sample which gives maximum extraction without substantial discoloration is the correct one to which to adjust the pH of the main batch of pulp.

Different fruits from different localities, as well as different mixtures of fruits, frequently have different optimum pHs at which maximum extraction is obtained without substantial darkening of the juice. For this reason and for the further reason that the juice may be given an undesirable color by the alkaline material even when its pH is below 9, even though no substantial loss due to saccharation occurs, the addition of just sufficient alkaline material such as lime to increase the pH of the batch undergoing treatment to the optimum is preferable. It is generally true that the more alkaline material added, the more danger there is of giving the juice a color which it will be difficult to remove.

While the determination with respect to each batch of fruit treated of the pH at which the pulp releases a maximum of juice without substantial darkening and the adjustment of the pH of that batch of pulp to such predetermined optimum point is none the less considered preferable, it has been found that in a number of batches of fruit material satisfactory results were obtained in each case by adding a quantity of lime sufficient to give the pulp a pH slightly in excess of 9, preferably about 9.5. Upon the addition of this quantity of lime the juice flowed from the pulp readily during extraction, at a pH which was well below 9, and was not substantially darkened.

The actual quantity of lime or other alkaline material added to the pulp is relatively small in any case and it is accordingly more convenient to control the addition of the alkaline material by the pH of the pulp. The actual quantity of lime or other alkaline material added will also vary rather widely for a variety of reasons. Thus, it is within the scope of the invention to add amounts of alkaline material which are somewhat greater or somewhat less than the amount required to produce the optimum pH since the addition of alkaline material aids the extraction even when the quantity used is not the optimum amount. The amount of lime or other alkaline material added may also vary because the natural pH of the fruit varies. Thus, while the natural pH of a number of fruits is about 4, this pH may vary not only among different fruits but among different lots of the same fruit. Lastly, the optimum pH for the pulp varies not only with different fruits and different mixtures of fruits, but also with fruits from different localities, as pointed out above. The actual quantity of lime or other alkaline material to be added may be predetermined by test along with the optimum pH, but it is preferable to simply add the alkaline material gradually until the pulp reaches the desired pH as determined by periodically checking the pH of the pulp.

To further aid the pressing or filtering operation the pulp mixture (including the alkaline material and water when used) is preferably heated to a temperature not in excess of about 170° F. prior to the pressing or filtering. Higher temperatures tend to break down certain impurities such as maltic and various other organic acids which may be present, and to give a permanent discoloration to the extracted juices. Very good results have been obtained with temperatures appreciably below 170° F.; for example, excellent pressing and extraction of sugar bearing juices was obtained when the limed, watered, and thoroughly agitated pulp was heated to from about 150° F. to about 160° F. for about five minutes prior to pressing or filtering, and this was accomplished without bringing into the extracted juice various organic acids which were neutralized and precipitated as solids and left in the pulp and without breaking down impurities and permanently discoloring the extracted juices. The time of heating may vary somewhat both above and below the five minutes mentioned above, particularly with variations of heating temperature, being, in general, less as the heating temperature increases. The heating may be omitted, in fact, if desired, although it has been found that best results are obtained if the heating is continued for at least five minutes at 150° F. to 160° F., which period represents the preferred minimum at these preferred temperatures so that longer heating times are not intended to be excluded from the scope of the invention.

Immediately following the heating of the pulp mixture as described, the pulp is pressed in a filter press, centrifuged or otherwise subjected to pressure to free the juice. In order to obtain maximum extraction of the sugar bearing juice, the solid material which is filtered out is preferably washed with a suitable material, such as water, until the washings coming through contain less than about 2% sugars. The redissolving of precipitated impurities during washing may be prevented, at least to a large extent, by adjusting the pH of the wash water to the same pH as that of the extracted juice. These washings or "sweet water" may either be added to the juice or returned into the process again for addition to a fresh batch of pulp in order to bring up the water content thereof to the desired point, as described above.

The juice as extracted is in a form in which it is particularly suited, as indicated above, for further processing to produce a sweetening medium in the form of a syrup. Accordingly it may be given further treatment immediately to convert it into a sweetening medium or it may be stored or put to other uses for which it is suited.

The proportion of the sugars present in the original fruit material which is recovered by the present process is extremely high. It has been found by analysis of the separated juices that these juices contain in excess of 90 per cent, and frequently in excess of 95 per cent, of the sugars originally present in the fruit. In some cases as much as 97 per cent or 98 per cent of the sugar present in the fruit has been recovered in the juice. The present process is thus a highly effective method for extracting sweetening ingredients from fruit, resulting as is apparent from the above, in the recovery in most cases of substantially all the sweetening ingredients or sugars originally present in the fruit, and in all cases of a very high percentage of these sweetening ingredients.

The filter cake or pulp remaining after the complete extraction of the sugar bearing juice is also useful. It contains some of the added lime or other alkaline material and can be dried and used for various purposes such as, for example, fertilizer filler. It is free from any sugar and will not ferment and form acetic acid and thereby sour the soil to which it is applied. Lime is also a desirable constituent of fertilizer and therefore its presence in the pulp enhances the value of the pulp for this use.

To further facilitate understanding of the improved extraction process disclosed herein, the following detailed example is given. This example is to be construed as merely illustrative and not as limiting the scope of the invention.

*Example*

Approximately 60 pounds of water were added to 600 pounds of pears and the pears were then ground to a fine, juicy pulp. Lime, in the form of a 6% aqueous solution or suspension, was then added, the mixture being simultaneously agitated until the pH of the pulp was increased to 9.6. The limed and watered mixture was then heated to 160° F. and maintained at this temperature for about five minutes. The mass showed cracking and evidence of the juice freeing itself from the mass in a clear break. Following the heating the mixture was transferred to a filter press and a sugar bearing juice was readily pressed out. To avoid loss of sugars in the pulp the filter cake remaining after the pressing was agitated and washed with water or "sweetened off" until the wash water contained less than approximately 2% sugars. This wash water or "sweet water" was added to the filtrate or juice.

Excellent separation of the sugars or sweetening ingredients of the sugar of the fruit in the form of an aqueous solution was obtained. The pears were found by analysis of a sample of expressed juice to contain 9% sugars, or approximately 54 pounds, prior to treatment. The extracted juice was not analyzed until after it had been further treated to eliminate impurities. Even after such further treatment, however, analysis showed that the product contained 51 pounds of sugar out of the 54 originally present.

The advantages of the present invention will be apparent from the foregoing description. Whereas, the application of substantial pressure to finely ground fruit pulp, instead of producing a clean break of the juice, presses out only a small portion and forms a slime or smooth, creamy mass, the addition of alkaline material as described herein causes the juice to break cleanly out of the pulp on pressing. This is accomplished, as pointed out above, without introducing into the juice any undesirable materials, or at least it does not introduce into the juice any foreign material which cannot be readily removed thereafter. At the same time, if sufficient water is present, substantially all of the sweetening ingredients or sugars present in the fruit material treated are carried out in dissolved form in the expressed juice. As disclosed above, the alkaline material present in the juice may be readily eliminated without objectionable loss of sugars or sweetening ingredients, where desired, by the process disclosed in a copending application.

Another very important advantage of this process is that the pulp remaining after extraction of the sugar bearing juice is left in a condition where it is highly useful for a variety of purposes, such, for example, as fertilizer. As pointed out above, certain methods heretofore used for extracting a sugar bearing liquid from fruits and fruit wastes have left the pulp in a practically useless state. Moreover, the pulp is not merely left in a useful state but, as pointed out above, is actually enhanced in value as fertilizer due to the presence of the lime therein which, as is well-known, is a valuable constituent of fertilizers.

It is believed that the presence of the alkaline material not only aids in cracking the pulp cells to free the juice but that, in addition, it increases the solubility of the desired sugars in the extraction liquid, promoting a more rapid and complete extraction, and also precipitates undesired water-soluble impurities which are left behind in the pulp instead of being carried along in the extracted juice.

It is apparent that many widely different embodiments of this invention may be made without departing from the spirit and scope thereof, and therefore it is not intended to be limited except as indicated in the appended claims.

The invention is hereby claimed as follows:

1. The process of extracting sweetening ingredients from fruit, which comprises pressing the fruit in the form of a finely ground pulp in the presence of a quantity of alkaline material sufficient to materially promote the extraction of the sweetening ingredients and give the mixture a definitely alkaline pH but insufficient to give the extracted liquid containing the sweetening ingredients a pH in excess of about pH 9 then recovering the extracted liquid containing the sweetening ingredients.

2. The process of extracting sweetening ingredients from fruit, which comprises pressing the fruit in the form of a finely ground pulp in the presence of a quantity of divalent alkaline material sufficient to materially promote the extraction of the sweetening ingredients and give the mixture a definitely alkaline pH but insufficient to give the extracted liquid containing the sweetening ingredients a pH in excess of about pH 9, then recovering the extracted liquid containing the sweetening ingredients.

3. The process of extracting sweetening ingredients from fruit, which comprises pressing the fruit in the form of a finely ground pulp in the presence of a quantity of alkaline material sufficient to materially promote the extraction of the sweetening ingredients and give the mixture a definitely alkaline pH but insufficient to give the extracted liquid containing the sweetening ingredients a pH in excess of about pH 9, then recovering the extracted liquid containing the sweetening ingredients, said alkaline material being selected from the group consisting of alkaline earth metal and magnesium oxides and hydroxides.

4. The process of extracting sweetening ingredients from fruit which comprises cracking the fruit by heating it in the form of a finely ground pulp to an elevated temperature below about 170° F. in the presence of a quantity of divalent alkaline material sufficient to materially promote the extraction of the sweetening ingredients and give the mixture a definitely alkaline pH but insufficient to give the extracted liquid containing the sweetening ingredients a pH in excess of about pH 9, then pressing the heated pulp in the presence of such a quantity of divalent alkaline material to press out a liquid containing a high percentage of the sweetening ingredients of the fruit and recovering the extracted liquid containing the sweetening ingredients.

5. A process for extracting substantially all the sweetening ingredients from fruit which comprises forming a mixture comprising the fruit in the form of a finely ground pulp, and a quantity of alkaline material sufficient to materially promote the extraction of the sweetening ingredients and give the mixture a difinitely alkaline pH but insufficient to give the extracted liquid containing the sweetening ingredients a pH in excess of about pH 9, then cracking the fruit by heating said mixture to an elevated temperature below about 170° F. and pressing the heated mixture in the presence of such a quantity of alkaline material to press out a liquid containing substantially all the sweetening ingredients of the fruit, then recovering the extracted liquid containing the sweetening ingredients, said alkaline material being selected from the group consisting of alkaline earth metal and magnesium oxides and hydroxides.

6. A process of extracting substantially all the sweetening ingredients from fruit which comprises forming a mixture comprising the fruit in the form of a finely ground pulp, and a quantity of lime sufficient to materially promote the extraction of the sweetening ingredients and give the mixture a definitely alkaline pH but insufficient to give the extracted liquid containing the sweetening ingredients a pH in excess of about pH 9, then cracking the fruit by heating said mixture to an elevated temperature below about 170° F. and pressing the heated mixture in the presence of such a quantity of lime to press out a liquid containing substantially all the sweetening ingredients of the fruit and recovering the extracted liquid containing the sweetening ingredients.

7. The process of extracting sweetening ingredients from fruit which comprises forming a mixture comprising the fruit in the form of a finely ground pulp, and a quantity of alkaline material sufficient to materially promote the extraction of the sweetening ingredients and give the mixture a definitely alkaline pH but insufficient to give the extracted liquid containing the sweetening ingredients a pH in excess of about pH 9, cracking the fruit by heating said mixture to a temperature in the range from about 150° F. to about 170° F. then pressing the heated mixture in the presence of such a quantity of alkaline material to press out a liquid containing the sweetening ingredients of the fruit, then recovering the extracted liquid containing the sweetening ingredients, said alkaline material being selected from the group consisting of alkaline earth metal and magnesium oxides and hydroxides.

8. The process of extracting sweetening ingredients from fruit which comprises pressing the fruit in the form of a finely ground pulp in the presence of a quantity of alkaline material sufficient to give the extracted liquid containing the sweetening ingredients an alkaline pH but insufficient to give the extracted liquid a pH in excess of about pH 9, then recovering the extracted liquid containing the sweetening ingredients.

9. The process of extracting sweetening ingredients from fruit which comprises pressing the fruit in the form of a finely ground pulp in the presence of a quantity of alkaline material sufficient to give the extracted liquid containing the sweetening ingredients an alkaline pH but insufficient to give said extracted liquid a pH in excess of about pH 9, then recovering the extracted liquid containing the sweetening ingredients, said alkaline material being selected from the group consisting of alkaline earth metal and magnesium oxides and hydroxides.

10. The process of extracting sweetening ingredients from fruit which comprises pressing the fruit in the form of a finely ground pulp in the presence of a quantity of lime sufficient to give the extracted liquid containing the sweetening ingredients an alkaline pH but insufficient to give said extracted liquid a pH in excess of about pH 9, then recovering the extracted liquid containing the sweetening ingredients.

11. The process of extracting sweetening ingredients from non-citrous fruit which comprises pressing the fruit in the form of a finely ground pulp in the presence of a quantity of alkaline material sufficient to materially promote the extraction of the sweetening ingredients and give the mixture a definitely alkaline pH but insufficient to give the extracted liquid containing the sweetening ingredients a pH in excess of about pH 9, then recovering the extracted liquid containing the sweetening ingredients, said alkaline material being selected from the group consisting of alkaline earth metal and magnesium oxides and hydroxides.

12. The process of extracting sweetening ingredients from fruit which comprises forming a mixture comprising the fruit in the form of a finely ground pulp, and a quantity of lime sufficient to give the mixture an alkaline pH below about pH 9 at which a maximum extraction of sweetening ingredients is obtained without substantial darkening of the extracted liquid containing said sweetening ingredients, cracking the fruit by heating said mixture to a temperature in the range from about 150° F. to about 170° F. then pressing the heated mixture in the presence of such a quantity of lime to press out a liquid containing the sweetening ingredients of the fruit and recovering the extracted liquid containing the sweetening ingredients.

13. The process of extracting sweetening ingredients from fruit which comprises forming a mixture comprising the fruit in the form of a finely ground pulp and a quantity of alkaline material sufficient to give the extracted liquid containing the sweetening ingredients an alkaline pH but insufficient to give said extracted liquid a pH in excess of about pH 9, cracking the fruit by heating said mixture to a temperature in the range from about 150° F. to about 170° F., then pressing the heated mixture in the presence of such a quantity of alkaline material to press out a liquid containing the sweetening ingredients of the fruit and recovering the extracted liquid containing the sweetening ingredients of the fruit, said alkaline material being selected from the group consisting of alkaline earth metal and magnesium oxides and hydroxides.

14. The process of extracting sweetening ingredients from fruit which comprises pressing the fruit in the form of a finely ground pulp in the presence of a quantity of alkaline material sufficient to give the mixture an alkaline pH above about pH 9 but insufficient to give the extracted liquid containing the sweetening ingredients a pH in excess of about pH 9, then recovering the extracted liquid containing the sweetening ingredients, said alkaline material being selected from the group consisting of alkaline earth metal and magnesium oxides and hydroxides.

15. A process for extracting substantially all the sweetening ingredients from fruit which comprises pressing the fruit in the form of a finely ground pulp in the presence of a quantity of alkaline material sufficient to materially promote the extraction of the sweetening ingredients and give the mixture a definitely alkaline pH but insufficient to give the extracted liquid containing the sweetening ingredients a pH in excess of about 9, then washing the filter cake with an aqueous medium to complete the extraction of the sweetening ingredients and recovering the liquid containing the sweetening ingredients so pressed and washed out, said alkaline material being selected from the group consisting of alkaline earth metal and magnesium oxides and hydroxides.

ARVID M. ERICKSON.
JOHN D. RYAN.

REFERENCES CITED

The following references are of record in the file of this patent:

UNITED STATES PATENTS

| Number | Name | Date |
|---|---|---|
| 1,991,242 | Cole et al. | Feb. 12, 1935 |
| 2,215,944 | Vincent | Sept. 24, 1940 |

FOREIGN PATENTS

| Number | Country | Date |
|---|---|---|
| 186,756 | Great Britain | 1922 |